United States Patent
Miller

(10) Patent No.: US 9,021,311 B2
(45) Date of Patent: Apr. 28, 2015

(54) METHOD AND APPARATUS FOR FILTERING TRACE INFORMATION

(75) Inventor: Gary L. Miller, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 164 days.

(21) Appl. No.: 13/596,881

(22) Filed: Aug. 28, 2012

(65) Prior Publication Data

US 2014/0068344 A1  Mar. 6, 2014

(51) Int. Cl.
*G06F 11/00* (2006.01)
*G06F 11/26* (2006.01)
*G06F 11/36* (2006.01)

(52) U.S. Cl.
CPC ............ *G06F 11/26* (2013.01); *G06F 11/3636* (2013.01)

(58) Field of Classification Search
CPC ........................... G06F 11/3636; G06F 11/364
USPC ............................................. 714/45, 46, 47.1
See application file for complete search history.

(56) References Cited

U.S. PATENT DOCUMENTS

| | | | |
|---|---|---|---|
| 5,642,478 A | 6/1997 | Chen et al. | |
| 6,708,173 B1 | 3/2004 | Behr et al. | |
| 6,834,365 B2 | 12/2004 | Bardsley et al. | |
| 6,961,872 B2 | 11/2005 | Yamamoto et al. | |
| 7,080,283 B1 * | 7/2006 | Songer et al. | 714/30 |
| 7,149,926 B2 * | 12/2006 | Ahmad et al. | 714/30 |
| 7,702,964 B2 | 4/2010 | John | |
| 8,527,812 B2 | 9/2013 | Shiina | |
| 8,612,939 B2 | 12/2013 | Marenco | |
| 2003/0046610 A1 | 3/2003 | Yamamoto et al. | |
| 2004/0052929 A1 * | 3/2004 | Kirby et al. | 427/58 |
| 2005/0289515 A1 | 12/2005 | Sudo et al. | |
| 2008/0148239 A1 * | 6/2008 | Petrov et al. | 717/128 |
| 2013/0111073 A1 * | 5/2013 | Dobbie et al. | 710/14 |
| 2014/0068345 A1 | 3/2014 | Miller et al. | |

OTHER PUBLICATIONS

Non-Final Office Action mailed Mar. 27, 2014 for U.S. Appl. No. 13/596,886, 14 pages.
Notice of Allowance mailed Aug. 25, 2014 for U.S. Appl. No. 13/596,886, 9 pages.

* cited by examiner

*Primary Examiner* — Dieu-Minh Le

(57) ABSTRACT

In a processing system comprising a plurality of data processors at an integrated circuit die, each data processor has a local debug module. In response to acquiring data trace information based upon a corresponding local filtering criteria, the local debug modules transmit their data trace information to a global resource from each of the local debug modules for further filtering by a common filtering criteria.

16 Claims, 11 Drawing Sheets

US 9,021,311 B2

METHOD AND APPARATUS FOR FILTERING TRACE INFORMATION

CROSS-REFERENCE TO RELATED APPLICATION(S)

The present application is related to co-pending U.S. patent application Ser. No. 13/596,886, entitled "METHOD AND APPARATUS FOR FILTERING TRACE INFORMATION," filed on Aug. 28, 2012, the entirety of which is herein incorporated by reference.

BACKGROUND

1. Field of the Disclosure

The present disclosure generally relates to electronic devices, and more particular to electronic device having debug capabilities.

2. Description of the Related Art

Debugging of data processors can be accomplished through the use of various tracing techniques, including program tracing and data tracing. Program tracing monitors the fetching and execution of instructions from program memory by a data processor, and captures information (program trace information) that can be used by a debugger to trace the flow of a program being executed by a data processor. Data tracing monitors data accesses to data memory that occur in response to executing program code, and captures information (data trace information) that can be used by the debugger to monitor stored data. Data trace information based upon a write access can be referred to as write access data trace information; while data trace information based upon a read access can be referred to as read access data trace information. A particular technique used to identify when trace information is to be captured uses a trace window to indicate an address range for which trace information is to be captured. For example, a data trace window, which identifies a memory address range to be monitored, can be used that is sufficiently large to include those address locations where data of interest is stored.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate example techniques for filtering data trace information that is received at a global debug controller from a plurality of local debug controllers. In at least one embodiment, a tag Random Access Memory (RAM) stores a filtering criteria that is used to filter a particular data trace information that includes the address, data, and attributes of a data access request captured by a local debug controller and the data information being accessed by the request (a data trace data). To illustrate, the global debug controller can provide a portion of the data trace address of the particular data trace information to a tag RAM at which a filtering criteria is stored. A tag bit may be associated with a plurality of addresses. As used herein, the term tag RAM is intended to mean a plurality of storage locations and associated logic that in response to receiving an address, such as a data trace address, will determine a state of a storage location, such as a bit of the tag RAM (a tag bit), that corresponds to the received address. If the returned tag bit is asserted, the global debug controller will maintain the particular data trace information being evaluated; otherwise, if the returned tag bit is negated, the particular data trace information being evaluated is discarded. Various embodiments of the present disclosure will be better understood with reference to FIGS. 1-11.

Figure 1:
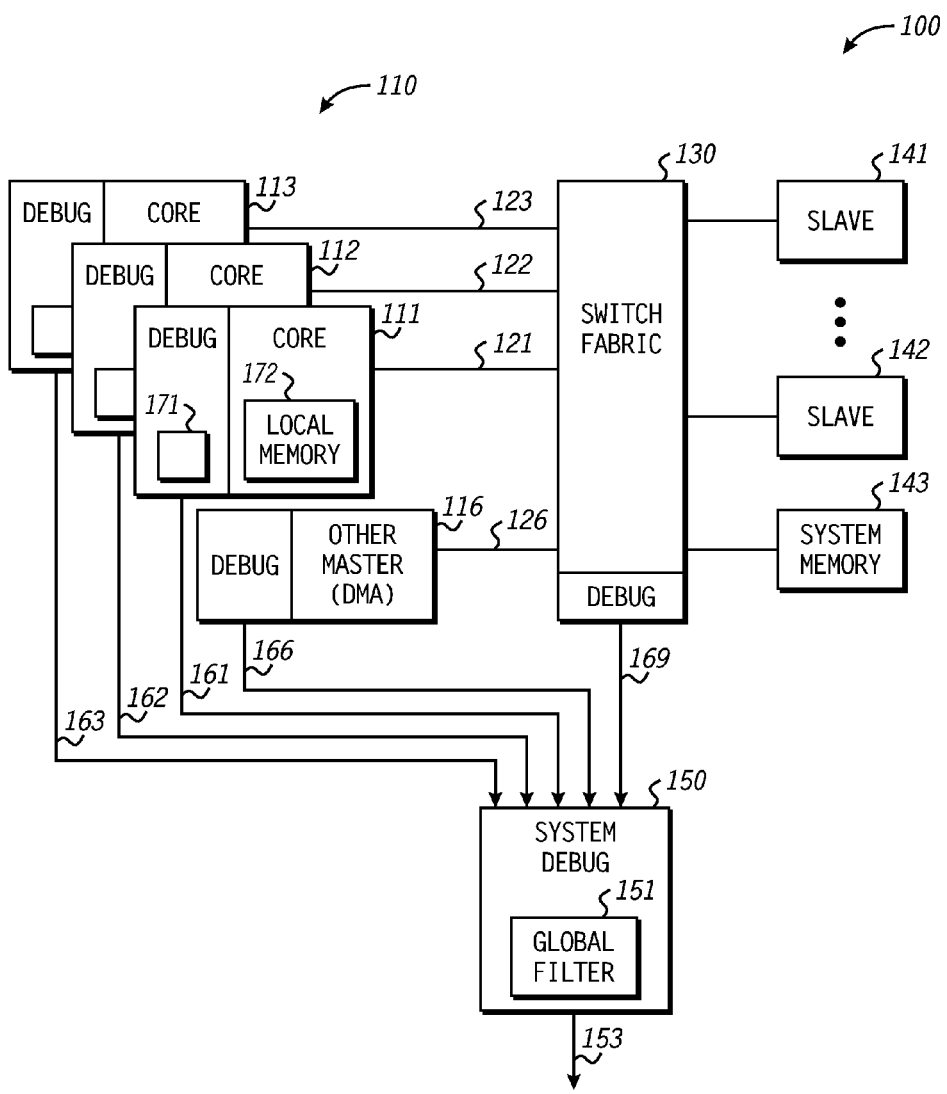
FIG. 1 is a block diagram of a processing system in accordance with a specific embodiment of the present disclosure.

FIG. 1 illustrates a processing system 100 employing a global data trace filtering criteria at a system debug module that is a common filtering criteria used to filter data trace information acquired from a plurality of debug clients. In the illustrated example, the processing system 100 includes a switch fabric 130 that communicates information amongst a plurality of master and slave devices. The master devices connected to the switch fabric 130 include a direct memory access (DMA) module 116, and general-purpose instruction based data processors 111-113. The slave devices connected to the switch fabric 130 include slave modules 141-143, where slave module 143 is specifically illustrated to be a system memory device.

The general purpose instruction-based data processors 111-113 can each be of the same or different type. For purposes of discussion, it is presumed that each of the data processors 111-113 are of the same type as data processor 111, which is illustrated in greater detail at FIG. 1 to include a core portion (CORE) and a debug portion (DEBUG). The core portion of data processor 111 is connected to the switch fabric 130 via an interconnect 121, and includes a local memory 172. The debug portion of data processor 111 is connected to the system debug module 150 via interconnect 161, and includes a filter module 171 that is dedicated to debugging the data processor 111 by applying a filtering criteria that is local to data processor 111. Similarly, core portions (not shown) of data processor modules 112, 113 are connected to the switch fabric 130 via corresponding interconnects 122, 123, while debug portions (not shown) of data processor modules 112, 113 are connected to the system debug module 150 via corresponding interconnects 162, 163. DMA 116 includes a core portion that is connected to the switch fabric 130 by interconnect 126, and a debug portion that is connected to the system debug module 150 via interconnect 166.

Each of the slave modules 141-143 are connected to the switch fabric 130 by a corresponding interconnect and can be accessed by master devices of the processing system 100. System debug module 150 is connected to a debug portion of the switch fabric 130 via interconnect 169, and to an interconnect 153, referred to as a debug port, through which debug information is communicated. According to a particular embodiment, the debug port 153 can be an external debug port that can be connected to an external debug system to transmit information. The debug port 153 can alternatively be used to transmit trace information to an internal memory or other memory map location for storage or handling. The system debug module 150 is further illustrated to include a global filter 151 that has a common filtering criteria that is applied to each of the trace information received from various debug clients.

The various debug modules are clients of the system debug module 150, and, therefore, can be referred to as client debug modules. In operation, the various client debug modules monitor operations of their corresponding master device to determine when data trace information is to be collected based upon the local filtering criteria enforced by their corresponding local filter. For example, the debug module of data processor 111 can monitor operation of its core portion based upon a local filtering criteria of filter module 171 to determine when to enable collection of data trace information.

According to an embodiment, a data trace window can be used to enable and disable data trace collection based upon whether the address of a data access is within, or outside of, the trace window. In response to enabling data trace collection during a write access request, write access data trace information will be captured, including the address of the write access and the data value being stored. The trace information collected in response to meeting the local filtering criteria are communicated to the system debug module 150, wherein a global filter module 151 applies a global filtering criteria to further filter the data trace information received from various local debug modules. Operation of the processing system of FIG. 1 will be better understood with respect to FIGS. 2-10.

Figure 2:
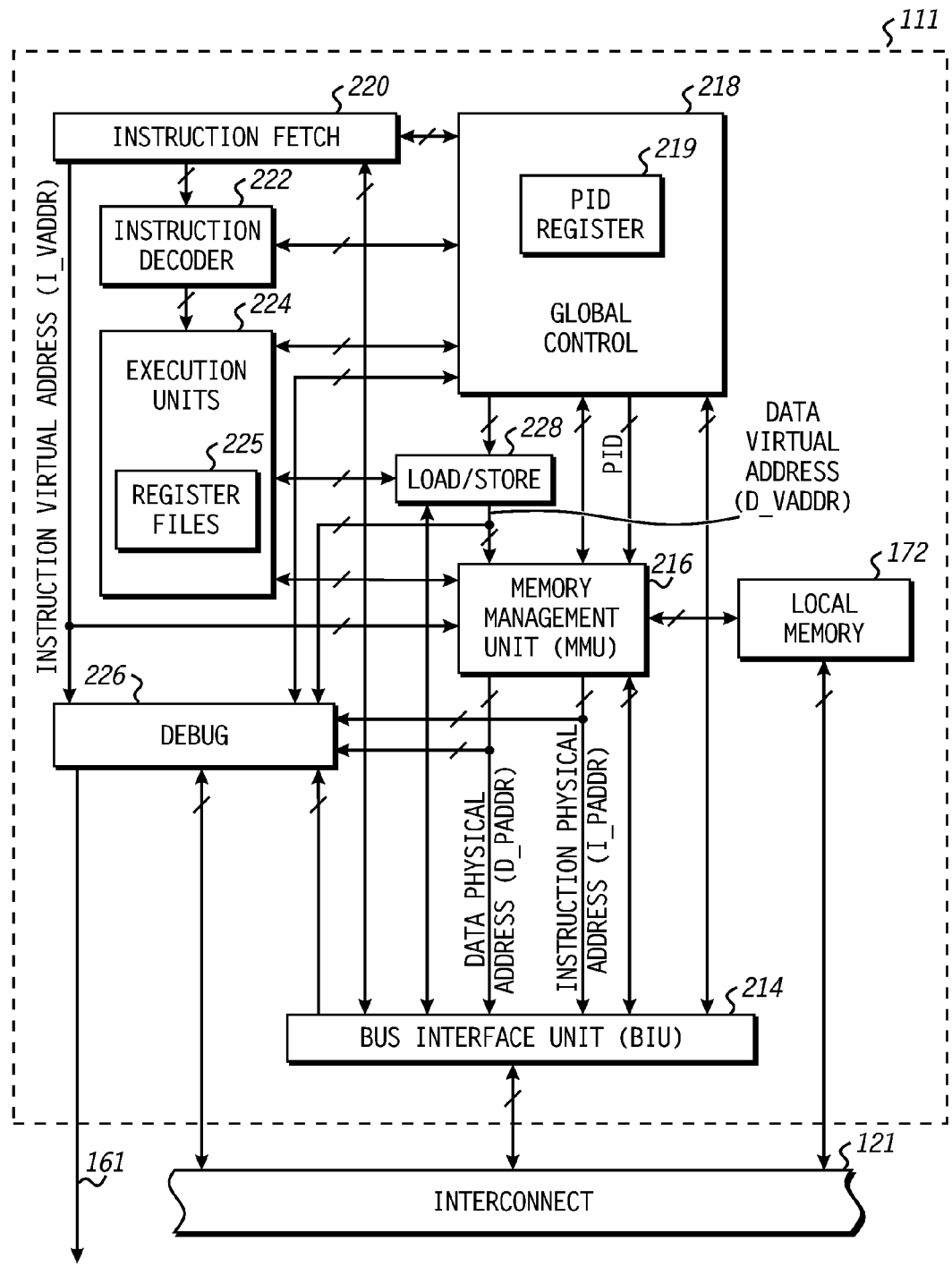
FIG. 2 is a block diagram illustrating a data processor of FIG. 1 in greater detail in accordance with a particular embodiment of the present disclosure.

Illustrated at FIG. 2 is a particular embodiment of the general purpose instruction-based data processor 111 of FIG. 1. A bus interface unit (BIU) 214 is connected to interconnect 121. BIU 214 is connected to memory management unit (MMU) 216. MMU 216 is connected to a first input/output terminal of a global control module 218. A second input/output terminal of global control module 218 is connected to a first input/output terminal of an instruction fetch unit 220. Instruction fetch unit 220 has an output connected to an input of an instruction decoder 222. An output of instruction decoder 222 is connected to an input of execution units 224. In one form, execution units 224 include at least one arithmetic logic unit, at least one floating point unit and at least one multiplier module. Within the execution units 224 are register files 225. An input/output terminal of instruction decoder 222 is connected to a third input/output terminal of the global control module 218. A first input/output terminal of execution units 224 is connected to a fourth input/output terminal of global control module 218. Execution units 224 and instruction fetch unit 220 are also connected to MMU 216. A load/store unit 228 has a first input/output terminal connected to a sixth input/output terminal of global control module 218. Load/store unit 228 has a second input/output terminal connected to a first input/output terminal of BIU 214. Load/store unit 228 has a third input/output terminal connected to a second input/output terminal of execution units 224. A second input/output terminal of BIU 214 is connected to a seventh input/output terminal of global control module 218. An output of load/store unit 228 provides a data virtual address (D_VADDR) and is connected to a first input of MMU 216 and a first input of debug module 226. An output of instruction fetch unit 220 provides an instruction virtual address (I_VADDR) and is connected to a second input of MMU 216 and a second input of debug module 226. A first output of MMU 216 provides a data physical address (D_PADDR) and is connected to a first input of BIU 214 and to a third input of debug module 226. A second output of MMU 216 provides an instruction physical address (I_PADDR) and is connected to a second input of BIU 214 and to a fourth input of debug module 226. The local memory 172 is connected to the MMU 216 via an interconnect. Debug module 226 has a second input/output terminal connected to interconnect 161.

In the illustrated form, BIU 214, MMU 216, global control module 218, instruction fetch unit 220, instruction decoder 222, execution units 224 with register files 225, debug module 226, load/store unit 228, and memory 172 collectively form the general-purpose instruction based processor 111 as indicated by the dashed line grouping in FIG. 2. The debug module 226 represents the debug portion of the data processor 111, and the remaining portions of FIG. 2 represent the core portion of the debug processor 111. While various modules of FIG. 2, and other figures, are illustrated in a segregated locations with specific connections, it will be understood that such modules may also be implemented in a distributed manner and be included within various other blocks of data processing system 100. For example, the storage locations described herein at the debug module 226 can be part of the register files 225 or other portion of the data processor 111. Also, in the illustrated embodiment, global control 218 includes a process identifier (PID) register 219 that stores a process identifier (PID) for the currently executing process. Global control 218 also provides the PID to MMU 216.

In operation, various modules of data processor 111 can communicate information with local memory 172, and other data processor modules, via MMU 216. Data processor 111 can communication with system memory 143 and with other devices connected to interconnect 121 via BIU 214. Instruction fetch unit 220 retrieves data processor instructions (i.e. program instructions) from BIU 214 under control of global control module 218. The retrieved instructions are sequentially communicated to instruction decoder 222 for decoding under control of global control module 218. Execution units 224 execute instructions and generate data that is either stored in a cache (not shown), in the local memory 172 via MMU 216, or routed to system memory via BIU 214 and interconnect 121. For purposes of discussion, it is presumed that local memory 172 is a volatile random access memory (RAM) stores data information, but not data processor instruction. Debugging of the operation of data processor 111 is performed by debug module 226, which generates debug information for further analysis, such as by an external development system (not shown). The data processor 111 enters a debug mode of operation in response to activation of the debug module 226, such as by an external development system via interconnect 161.

In the illustrated form, debug module 226 is configured to monitor information being communicated via various interconnects of data processor 111. For example, interconnects that communicate information to and from the instruction fetch module 220 can be monitored by the debug module 226 to trace data processor 111 program execution; while interconnects that communicate information to and from local memory 172 can be monitored by the debug module to trace data accesses to the local memory 172. It will be appreciated, that the local debug module 226 can also monitor other resources of data processor 111, such as the interface with the interconnect 121. The monitored information includes data values being communicated to/from memory locations, the addresses of those memory locations, and the access attributes. Addresses can include data virtual addresses, data physical addresses, program (instruction) virtual addresses, program physical addresses, data information from BIU 214, and load/store unit 228, and information from global control 218. A data address of the data memory is an address of program memory where data resides whereas a program address is an address where an instruction resides. Program virtual addresses are provided from instruction fetch unit 220 to the debug module 226 and MMU 216. A virtual address is an un-translated address which requires some further processing or translating to obtain a translated address of the physical storage location where the information is residing. MMU 216 provides instruction physical addresses to BIU 214 and debug module 226 by translating addresses of virtual pages of memory to corresponding physical page addresses. Debug module 226 forms a debug message to be communicated to a location external data processor 111.

Figure 3:
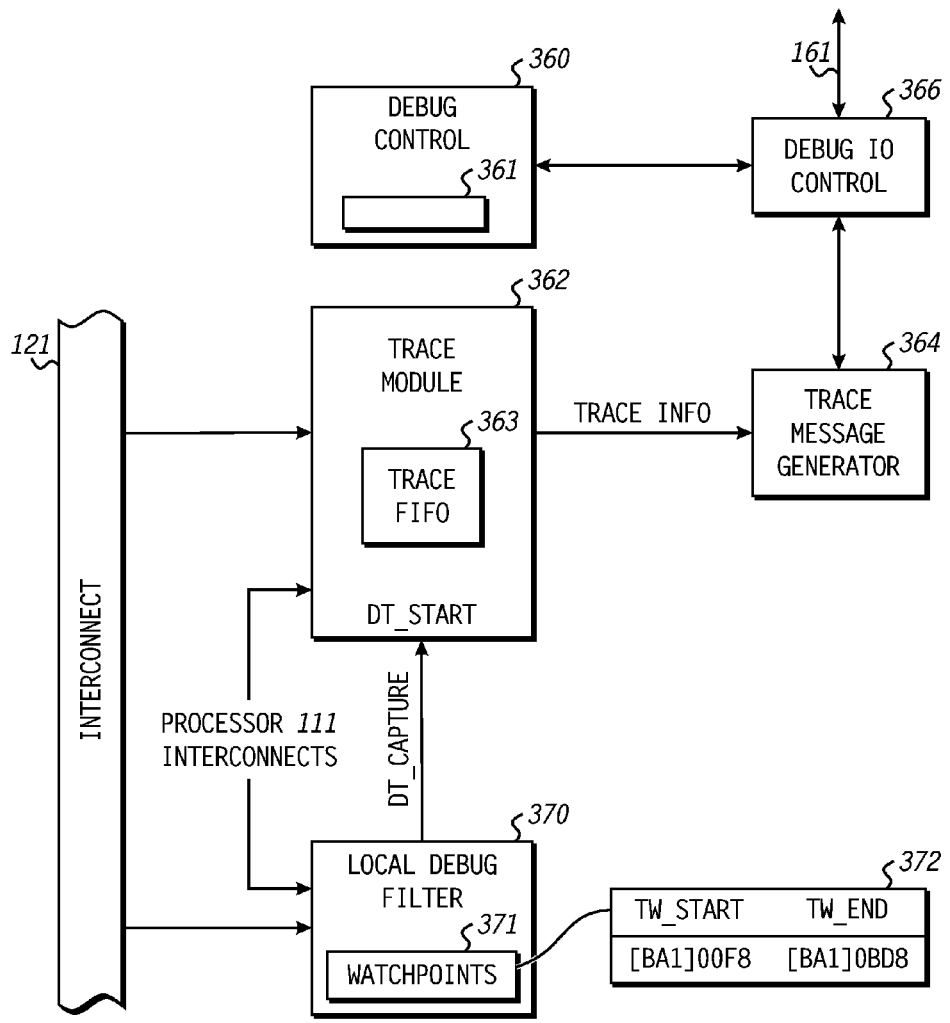
FIG. 3 is a block diagram illustrating a debug control module of FIG. 2 in greater detail in accordance with a particular embodiment of the present disclosure.

Illustrated in FIG. 3 is an exemplary embodiment of the debug module 226 of FIG. 2 that includes debug control module 360, trace module 362, local debug filter 370, debug input/output (I/O) module 366, and trace message generator 364. Debug control module 360 is used to control operation of the debug module 226, and is connected to interconnect 161 via debug I/O control module 366 to communicate external from the data processor 111, and to other modules of FIG. 3 (not shown). According to a particular embodiment, interconnect 161 can include a standardized interface, such as a JTAG (Joint Test Access Group) interface, that meets a particular standard. For purposes of discussion, various connections between features disclosed the present figures, including FIG. 3, are illustrated with arrows indicative of a particular direction of data flow with respect to an embodiment described herein. It will be appreciated, however, that the arrow indications are not intended to indicate a connection can only transmit information in a particular correctional manner, such as the bidirectional or unidirectional manner.

Debug control module 360 includes a register 361 that can store information used to control operation of the debug control module 226. For example, register 361 can include: a field labeled DEBUG_EN that when asserted enables operation of the debug module 226; a field labeled PGM_TRACE_EN that when asserted enables program trace messaging to be performed, assuming DEBUG_EN is asserted; a field labeled DATA_TRACE_EN that when asserted enables data trace messaging to be performed, assuming DEBUG_ENABLE is asserted and assuming that the debug module 226 is otherwise configured t capture data information; and the like. During operation, the debug control module 360 can receive information from external the data processor 111, e.g., via the debug I/O control module 366, such as commands that when executed retrieve and store data information at various storage locations of debug module 226 or data processor 111, commands that control operation of the debug module 226, and the like. An example of a debug command that can be executed by the debug control module 360 includes a command that writes to fields of register 361 to enable/disable debug operation.

When operation of the debug module 226 is enabled, e.g., the field DATA_TRACE_EN is asserted, the local filter module 372 monitors operation of the processing system 111 to detect the occurrence of various system events, referred to as watchpoint events, that can control the manner in which the debug module 226 operates. Various types of watchpoints exist, each of which can be enabled based upon information stored at the watchpoints registers 371. For example, watchpoint registers 371 are illustrated to include a register 372 that is associated with a specific type of watchpoint, referred to as a data trace window, that specifies a trace window, e.g., a particular address range, that is to be traced.

For purposes of discussion, the trace window of register 372 is presumed to be a data trace window, as opposed to a program trace window. The register 372 includes a field labeled TW_START that is programmed to a starting address (0x[BA1]00F8) of the data trace window, and a field labeled TW_END that is programmed to a last address (0x[BA1]0BD8) of the data trace window, wherein [BA1] represents a base address of the local memory 172 of data processor 111. In operation, the local filter module 370 monitor interconnects of data processor 111 by comparing address information for current data accesses to determine if the access is within the data trace window of register 372. The local debug filter 370 will assert signal DT_CAPTURE in response to determining that the address of a current data access is within the data trace window; otherwise, the signal DT_CAPTURE will be negated. Operation of the local filter module 370 will be better understood in reference to FIG. 4, below.

Trace module 362 includes an input DT_ON that is connected to the local debug filter 370 to receive the signal labeled DT_CAPTURE. In response to signal DT_CAPTURE being asserted, trace module 362 will capture data trace information pertaining to the current data access. For example, the trace module 362 will capture address and data information from a bus of data processor 111 over which data access requests are communicated. Captured trace information is stored at the trace FIFO 363 for additional handling by the debug module 226.

Figure 4:
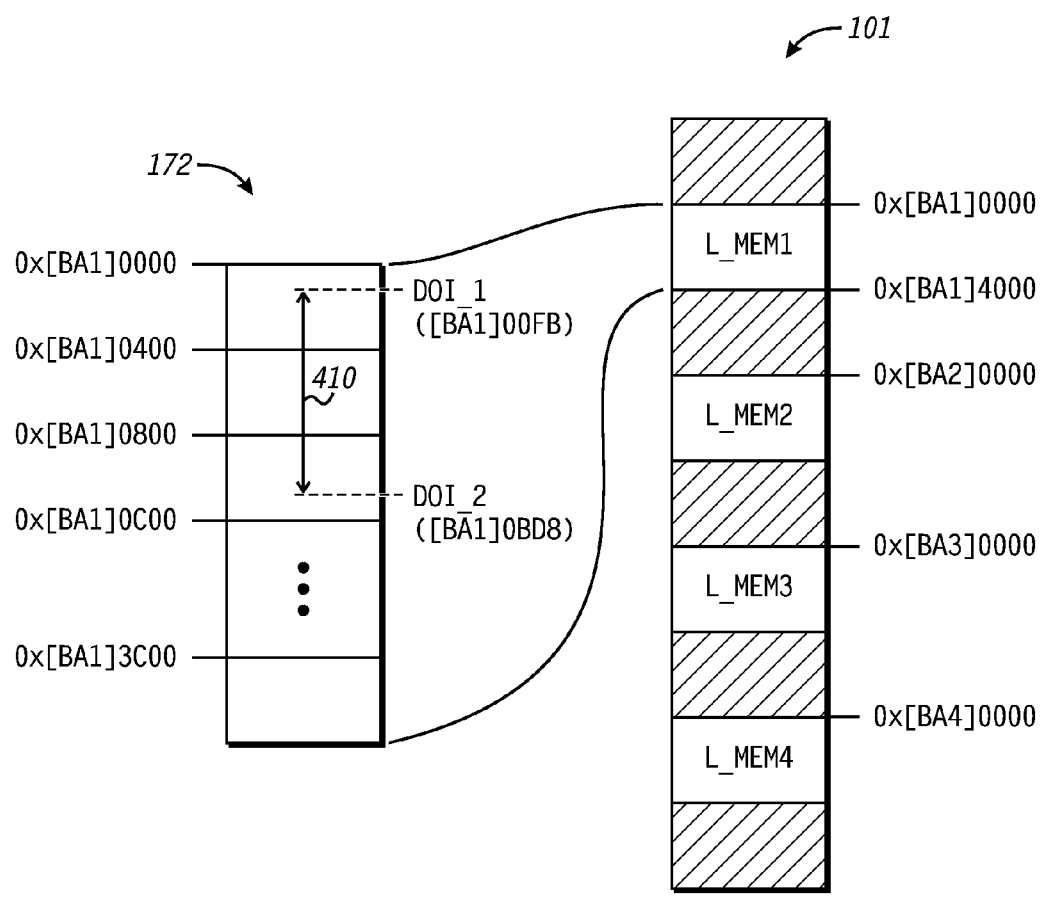
FIG. 4 is a block diagram illustrating a memory map and local memory of the memory system of FIG. 1 in accordance with a particular embodiment of the present disclosure.

FIG. 4 illustrates a unified memory map 101 of the data processing system 100 of FIG. 1. Memory map 101 includes: an address range labeled MEM1 that represents the location of local memory 172 of data processor 111; an address range labeled MEM2 that represents the location of local memory of data processor 112; an address range labeled MEM3 that represents the location of local memory of data processor 113; and an address range labeled MEM4 that represents the location of system memory 143. The size of the memory ranges MEM1-MEM4 can vary based upon the actual size of memories they represent.

The beginning address of each of the memory regions MEM1-MEM4 are aligned to respective 64 Kilo byte (kB) boundaries: 0x[BA1]0000, 0x[BA2]0000, 0x[BA3]0000, and 0x[BA4]0000. Wherein, [BA1] represents a base address of memory region MEM1, [BA2] represents a base address of memory region MEM2, [BA3] represents a base address of memory region MEM3, and [BA4] represents a base address of memory region MEM4. For purposes of discussion, the memory region MEM1, which corresponds to local memory 172 of data processor 111, is presumed to have a 16 kB address space, wherein only the fourteen least significant bits [b13:b0] of the address are used to access a particular byte of the memory. Thus, the address of the top-most byte of region MEM1 is 0x[BA1]0000, and the address of a bottom-most byte of the memory range MEM1 is 0x[BA1]3FFF, e.g., the address of the next byte following memory location MEM1 is 0x[BA1]4000, as illustrated in FIG. 4.

Also illustrated at FIG. 4 is a block diagram of the 16 kB local memory 172 of data processor 111, which corresponds to memory region MEM1 of the unified memory map 101. As discussed above, it is often desirable during debug operation to monitor only specific data values, which are stored a particular memory location. Two locations of local memory 172, DOI_1 and DOI_2, containing data of interest are identified, wherein data of interest is information that is to be monitored during operation of data processor 111. In particular, the first data of interest DOI_1 is stored at memory location 0x[BA1]00F8 and the second data of interest DOI_2 is stored at memory location 0x[BA1]0BD8. It is assumed for purposes of discussion that processor 111 supports 64-bit data words, and therefore, the memory locations for DOI_1 and DOI_2 are aligned to 8-byte boundaries of local memory 172. A data trace window, represented by arrow 410, has been programmed that includes the addresses of DOI_1 and DOI_2, such that data access requests to DOI_1 and DOI_2, as well as to other addresses, will be detected as access requests to the data trace window.

Because only two data addresses need to be monitored, the trace window 410 is defined by programming the field TW_START of the trace window register 372 to the address of DOI_1 (0x[BA1]00FB), and programming the field TW_END to the address of DOI_2 (0x[BA1]0BD8). In the present example, the trace window address range includes 349 64-bit data words, each of which will be traced even though only two 64-bit address locations within this range contain data of interest. It will be appreciated, that while data trace windows have been specifically described with respect to capturing data trace information, that other watchpoints based upon other system criteria can be also be used to capture data trace information.

The captured information stored at FIFO 363 is accessed by the trace message generator 364, which can format and transmit the trace information, via debug IO control module 366, to the system debug module 150 (FIG. 1) for further processing. The debug modules of each of the other masters of the processing system 100 can operate in a similar manner as debug module 226 to capture data trace information meeting various local filter requirements, and to transmit data trace information to the system debug module 150.

Figure 5:
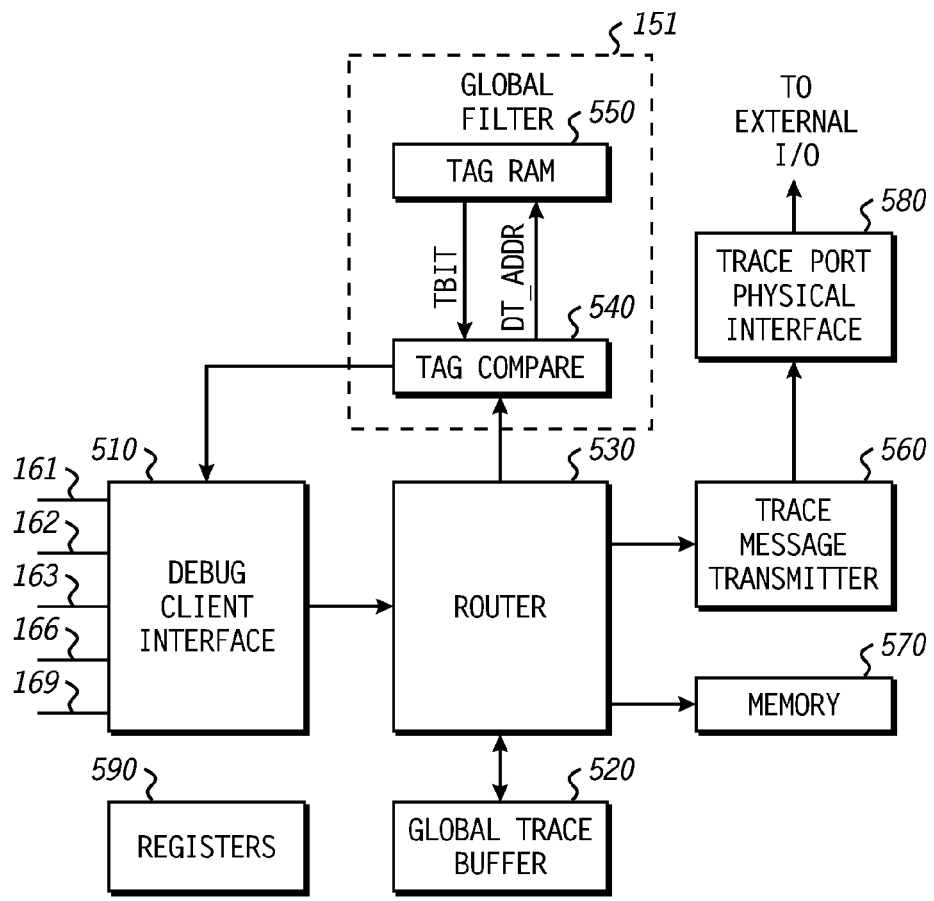
FIG. 5 is a block diagram illustrating a system debug module of FIG. 1 in greater detail in accordance with a particular embodiment of the present disclosure.

FIG. 5 illustrates the system debug module 150 in greater detail to include a debug client interface 510, a global trace buffer 520, a router module 530, a tag RAM compare module 540, a tag RAM 550, the trace message transmitter 560, the global I/O control module 580, a memory 570, and registers 590.

Debug client interface 510 is connected to receive all kinds of trace information from various masters of data processing system 100 via interconnects 161-163, 166, 169, and from tag compare module 540. Received data trace information is provided to the router 530, which is connected to the tag compare module 540, the trace message transmitter 560, the memory 570, and to the global trace buffer 520. It is presumed that router 530 stores data trace information received from the debug client interface 510 at the global trace buffer 524 for subsequent handling, though it will be appreciated that in other embodiments, received data trace information does not need to be buffered before being routed to other locations.

Data trace information stored at the global trace buffer 520 is accessed by the router 530, which determines whether the data trace information is to be routed to the tag comparator 540 for additional filtering, routed to the trace message transmitter, or routed to memory 570. Registers 590 can have a GLOBAL_FILTER_EN field (not shown) that if asserted results in the data trace information being further filtered by the tag compare module 540, as described below. Otherwise, if the GLOBAL_FILTER_EN field is negated, the data trace information is provided to the trace message transmitter or to the memory 570. The trace message generator 560 can format data trace information received from router 530 in a particular format before for transmitting the data trace information to an external debugger via the global I/O control 580. Alternatively, the router 530 can forward the data trace information for storage at a memory 570, which can be system memory, or memory local to the system debug module.

If the filter information at registers 590 indicates that data trace information is to be filtered further, router 530 will provide data trace information retrieved from the global trace buffer 520 to the tag compare module 540 for additional filtering. The tag compare module 540 provides a data trace address (DT_ADDRESS) of a particular data trace information to tag RAM 550, and in return receives a bit, referred to as a tag bit (TBIT), from the tag RAM 550. The tag bit is retrieved from a location of tag RAM 550 that corresponds to the provided data trace address. If the returned tag bit is asserted, the data trace information being evaluated is sent to the debug client interface, and therefore is maintained by virtue of meeting the filter criteria stored at tag RAM 550. Otherwise, the trace information being evaluated will be discarded if TBIT is negated. Operation of the tag compare module 540 and the tag RAM 550 will be better understood in reference to FIG. 6.

Figure 6:
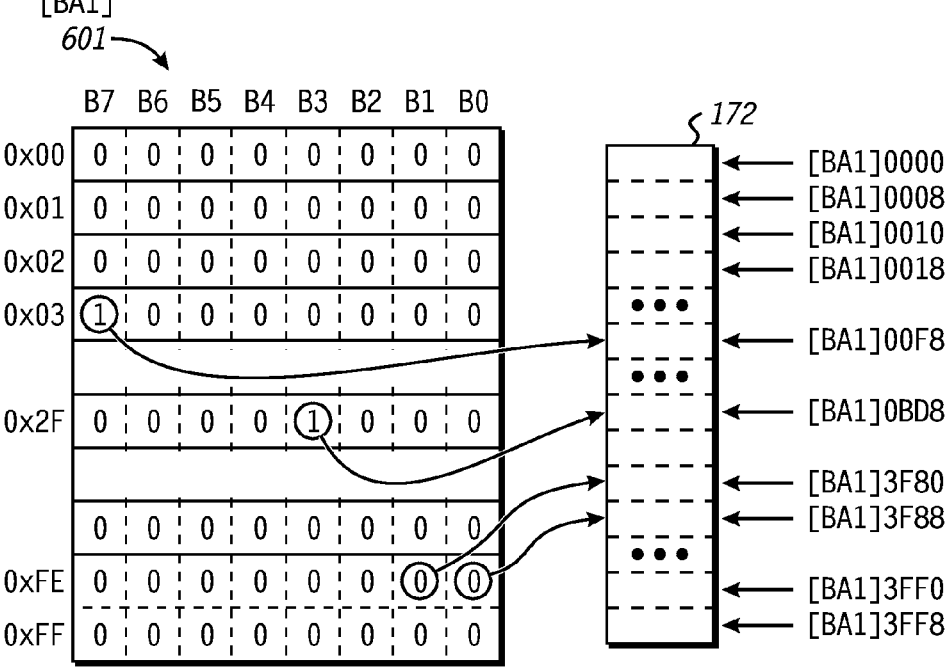
FIG. 6 is a block diagram representing the contents of a memory of FIG. 5 in accordance with a particular embodiment of the present disclosure.

FIG. 6 illustrates, in block diagram form, the local memory 172 of data processor 111 and a portion of the tag RAM 550 referred to as tag RAM 601. The tag RAM 601 includes a plurality of bit locations, each of which corresponds to a 64-bit data word of the local memory 172. It will be appreciated that the plurality of bit locations of the tag RAM 550 can correspond to data word sizes other than 64-bit words. Thus, as used herein, the term "word" as used with respect to a corresponding location of tag RAM is intended to mean any number of bits associated with the corresponding location of tag RAM. Thus, a location of tag RAM 550 can correspond to words having less than 64 bits or more than 64 bits. Thus, assuming a 64-bit word, tag RAM 550 of FIG. 6 includes 2048 bits corresponding to the 2048 64-bit data words of the 16 kB local memory 172. The 2048 bits of the tag RAM 550 are configured as an array of byte wide storage locations, labeled 0x00 through 0xFF, each of which correspond to a tag RAM address. Bit B0 at tag RAM address 0x00 corresponds to the 64-bit data word at local memory 172 address 0x[BA1]0000; bit B1 at tag RAM address 0x00 corresponds to the 64-bit data word at local memory 172 address 0x[BA1]0008; bit B2 at tag RAM address 0x00 corresponds to the 64-bit data word at local memory 172 address 0x[BA1]0010; and so on through bit B7 at tag RAM address 0xFF which corresponds to the 64-bit data word at local memory 172 address 0x[BA1]2FF8.

Figure 7:
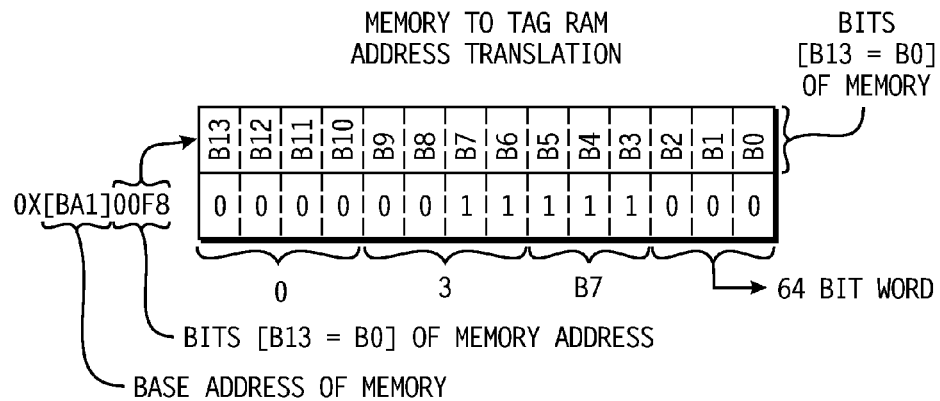
FIG. 7 illustrates a mapping of various data trace address bits in a manner used to access a memory of FIG. 5 in accordance with a particular embodiment of the present disclosure.

FIG. 7 illustrates the relationship between tag RAM bits and local memory addresses of memory 172. In particular, FIG. 7 illustrates the address of DOI_1, which includes a base address portion [BA1] and 14 least-significant bits [b13: n0]. The base address portion 0x[BA1]00F8 is translated, e.g., by tag RAM 550, to determine a corresponding portion of tag RAM 550 where filter information is stored. For example, the base address portion [BA 1] can be used to determine a corresponding base address of the tag RAM 550. For simplicity, a corresponding base address of tag RAM 550 is not illustrated in FIG. 6. However, it will be appreciated that tag memory 601 corresponds to the relevant portion of tag RAM 550 that corresponds to base address [BA1].

Bits b13:b6 of the least significant 13 bits provide the address of tag memory 601 that includes the bit location corresponding to address 0x[BA1]00F8. In the present example, bits B13:B6 indicate that the address of tag memory 601 corresponding to local memory address 0x[BA1]00F8 is 0x03. Bits b5:b3 provide the bit location of the tag RAM byte at tag RAM address 0x03 that corresponds to address 0x[BA1]00F8, which is bit b7. Bits b2:b0 are ignored, as they correspond to the 8 bytes of the 64-bit word of interest. Because the content of address 0x[BA1]00F8 is to be monitored, bit b7 of tag RAM address 0x03 has been programmed to an asserted state. Also, because the content of address 0x[BA1]0BD8 (DOI_2) is to be maintained, bit b3 of tag RAM address 0x2F has also been programmed to an asserted state. No other bits of tag RAM 601 are to be traced, and have therefore been programmed to a negated state to indicate that all trace information, other than trace information for DOI_1 and DOI_2, can be discarded. Note that even though the tag memory 601 stores a filter criteria that corresponds exclusively to trace information of memory 172, it will be applied globally to data trace information of memory 172, regardless of the processor that performed the access. Thus, it will be appreciated that storage states of tag RAM 550 represent a filter criteria that is globally applied to all data trace messages.

Data trace messages meeting the filter criteria of tag RAM 601 are sent from the tag memory compare module 540 to the debug client interface 510, which in turn stores the data trace information meeting the filter criteria in the global trace buffer 520. In addition, data trace messages meeting the filter criteria of tag RAM 601 are flagged as having been filtered by tag RAM 601. This allows the router 530 to determine data trace information that has been previous filtered by the filtering criteria of tag RAM 550 to be forwarded to the trace message transmitter 560, or stored at memory 570.

Thus, data trace information associated with a word address, or a sub-address of the word address (e.g., a byte address), from local memory 172 is determined to meet a filter criteria of tag RAM 550 in response to the tag RAM bit corresponding to the data trace address of the data trace information being asserted. Data trace information meeting the filter criteria is maintained by tag memory compare module 540 providing the data trace information back to the debug client interface 510 for storage in the global trace buffer 520. In accordance with a particular embodiment, the data trace information will be flagged, e.g., by the tag compare module 540 or the debug client interface 510, as having been processed by the tag compare module 540 so that router 530 will not route the data trace information to the tag compare module a second time. It will be appreciated that there are various ways that the data trace information can be flagged. For example, a designator associated with the data trace information, referred to herein as a transfer code, can be changed to a value that will prevent the router 530 from rerouting the data trace information to the tag memory compare module 540. Conversely, data trace information that does not meet the filter criteria is discarded, e.g., the tag memory compare module 540 does not route the data trace information to the debug client interface.

Figure 8:
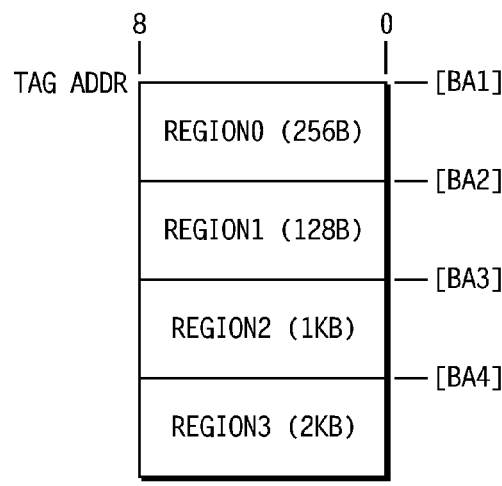
FIG. 8 is a block diagram illustrating a memory map for the tag RAM of FIG. 5 in accordance with a particular embodiment of the present disclosure.

FIG. 8 illustrates a memory map of the tag RAM 550 that includes regions labeled REGION_0 through REGION_3. REGION_0 corresponds to the portion 601 of tag RAM 550 described at FIG. 5 used to filter data trace information for accesses to the local memory of processor 111. REGION_1 corresponds to a portion of tag RAM 550 used to filter data trace information for accesses to the local memory of data processor 112 in the manner described at FIG. 5. REGION_2 corresponds to a portion of tag RAM 550 used to filter data trace information for accesses to the local memory of data processor 113 in the manner described at FIG. L. REGION_3 corresponds to a portion of tag RAM 550 used to filter data trace information for accesses to the system memory 143 of the data processing system 100.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Figure 9:
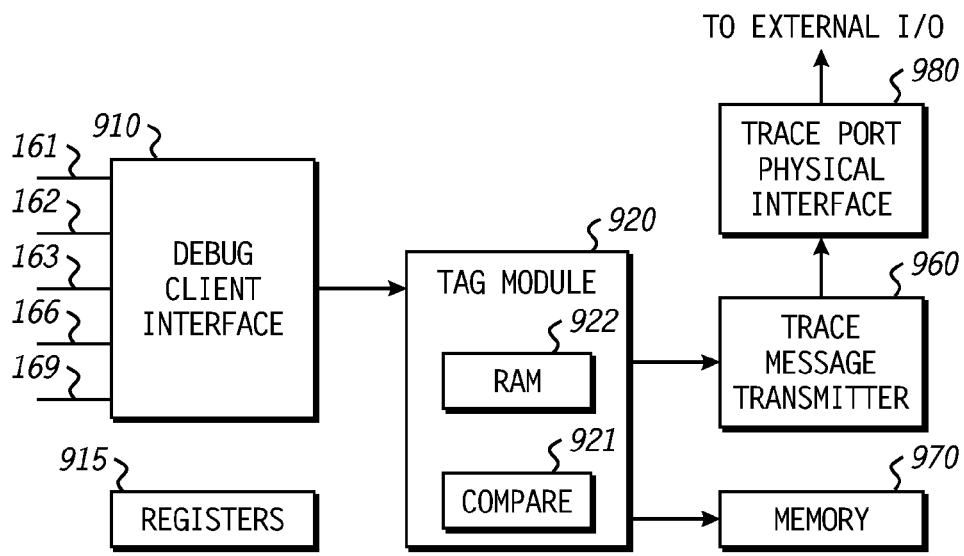
FIG. 9 is a block diagram illustrating an alternate embodiment of a system debug module of FIG. 1 in greater detail.

For example, it will be appreciated that the system debug module 150 can be implemented in various manners. FIG. 9 illustrates an alternate embodiment of the system debug module 150 that does not include a global trace buffer, or a router as illustrated in FIG. 5. The embodiment of the system debug module 150 of FIG. 9 includes a debug client interface 910 that operates in a similar manner as debug client interface 510, a tag module 920, a trace message generator 960 that operates in a similar manner as trace message generator 560, a global I/O control module 980 that operates a similar manner as global I/O control module 580, a memory 970 that corresponds to memory 570, and registers 990.

Data trace information received at debug client interface 910 from a client debug module is forwarded to tag module 920 without being buffered. Tag module 920 includes a tag compare module 921 and tag RAM 922 that operate in a similar manner as tag compare module 540 and tag RAM 550 of FIG. 5, respectively. Thus, data trace information received at the tag module 920 are filtered based upon the global filter criteria stored at tag RAM 922. According to an embodiment, non-data trace information is forwarded from tag RAM 922 without filtering, while each data trace information is filtered by the tag RAM 922. With respect to received data trace information, assuming each data word of the local memory is associated with a corresponding tag bit in tag RAM 922, only those data words having their corresponding tag bit asserted in tag RAM 922 will be forwarded from tag module 922 to one of the tag message generator 960 and the memory 970, while those data words having their corresponding tag bit negated will be discarded.

It will be appreciated, that the tag RAM 550 can be implemented differently than that described in reference to FIG. 5.

For example, instead of providing a fixed number of bits for a particular memory or memory range, a smaller tag RAM could be implemented by allowing the tag RAM to be programmable to support filtering of specific portions of client memory, as defined by the user. This can be accomplished through the use of programmable base addresses and memory sizes. For example, the tag RAM can include one or more registers that can be programmed to store address ranges that are to be globally filtered by the system debug module 150. For example, such a register defining an address range to be filtered by the tag RAM can include: a base address field; and a size field, that indicates the beginning and end of a memory region to be further filtered, which can include a word size field that indicates how many bytes of local or system memory correspond to each bit of the TAG RAM 150, e.g., how many bytes in a data word. The ability to assign tag RAM address space in this manner facilitates using the tag compare module 540 to filter only a desired portion of local or system memory 172. The manner in which data trace information not represented in a tag RAM programmed in this manner 550 is filtered can vary, and will be better understood with reference to FIG. 10.

Figure 10:
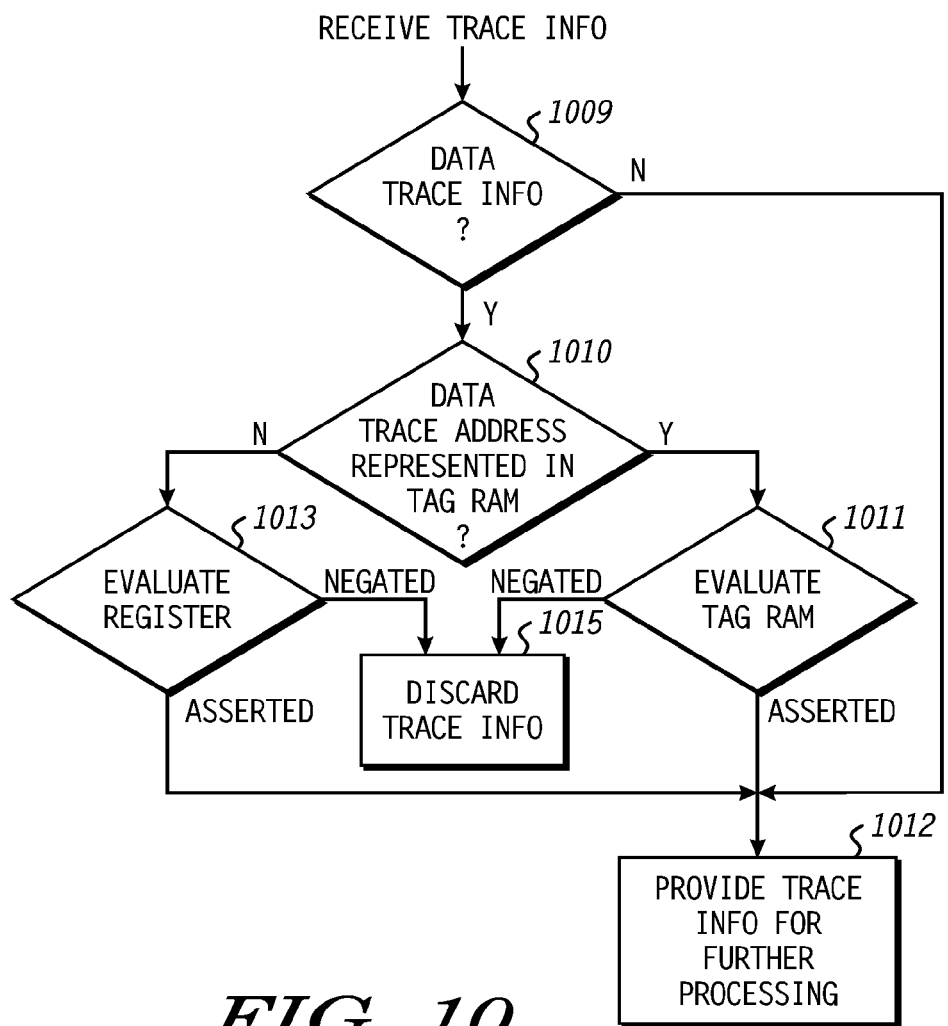
FIG. 10 is a flow diagram of a method in accordance with an embodiment of the present disclosure.

At block 1009 of FIG. 10, it is determined whether or not received trace information is data trace information. If so, flow proceeds to block 1010; otherwise, flow proceeds to block 1012 where the trace information is further processed. At block 1010, it is determined whether a data trace address of the received data trace information is represented in the tag RAM for example, it is determined whether a register of the tag RAM has been configured to include an address range that corresponds to the data trace address of the data trace information being processed. If not, flow proceeds to block 1013; otherwise, flow proceeds to block 1011 where the data trace information is further evaluated, e.g., filtered, by the filter criteria stored at tag RAM.

At block 1011, if the tag bit that corresponds to the data trace address is asserted, the data trace information meets the filtering criteria and is maintained, wherein flow proceeds to block 1012; otherwise, if the tag bit is negated, flow proceeds to block 1015 and the current data trace information is discarded.

However, if it was determine at block 1010 that the received data trace address was not represented in tag RAM, flow proceeds to block 1013 wherein a field of a register, such as a field of register 915, is evaluated to determine whether or not the data trace information is to be maintained. For example, if the register field is asserted all data trace information not having a corresponding bit in tag RAM, e.g., data trace information not represented in tag RAM 922, is to be maintained; otherwise, flow proceeds to block 1015 if the register field is negated all data trace information that does not have a data trace address represented in tag RAM 922, where the data trace information is discarded.

Figure 11:
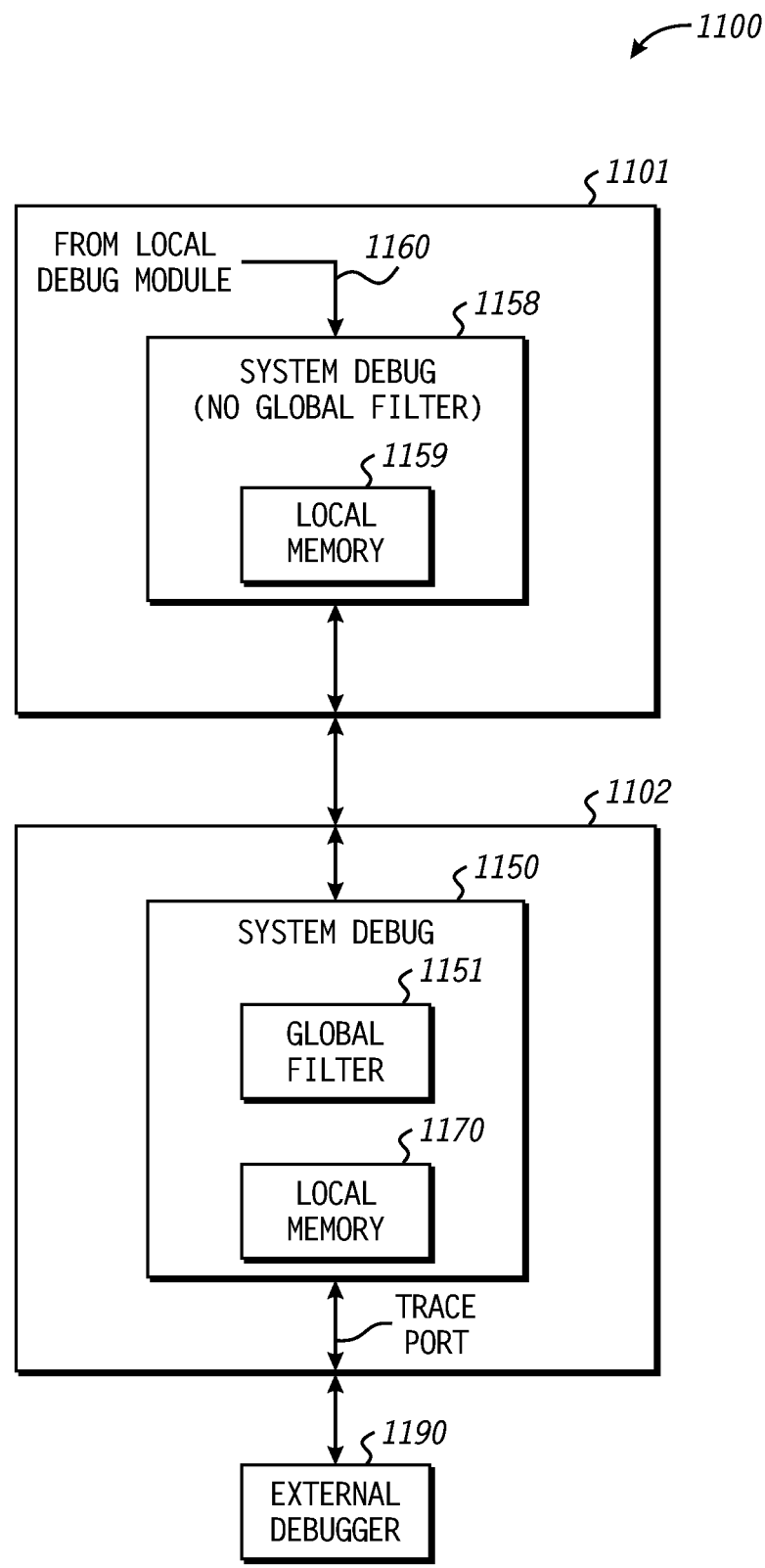
FIG. 11 is a block diagram of a processing system in accordance with an alternate embodiment of the present disclosure.

In another embodiment of the present disclosure, the global filter that filters data trace information from the plurality of client debug modules can be implemented at a different integrated circuit die than that at which some or all of the master devices of FIG. 1 reside. For example, FIG. 11 illustrates a processing system 1100 that includes a first integrated circuit die 1101 and a second integrated circuit die 1102. Integrated circuit die 1101 is presumed to have the same features as those illustrated at FIG. 1, except that the processor system at die 1101 has a different system debug module 1158 that does not include a global filter, as will be better understood with reference to FIG. 12.

Figure 12:
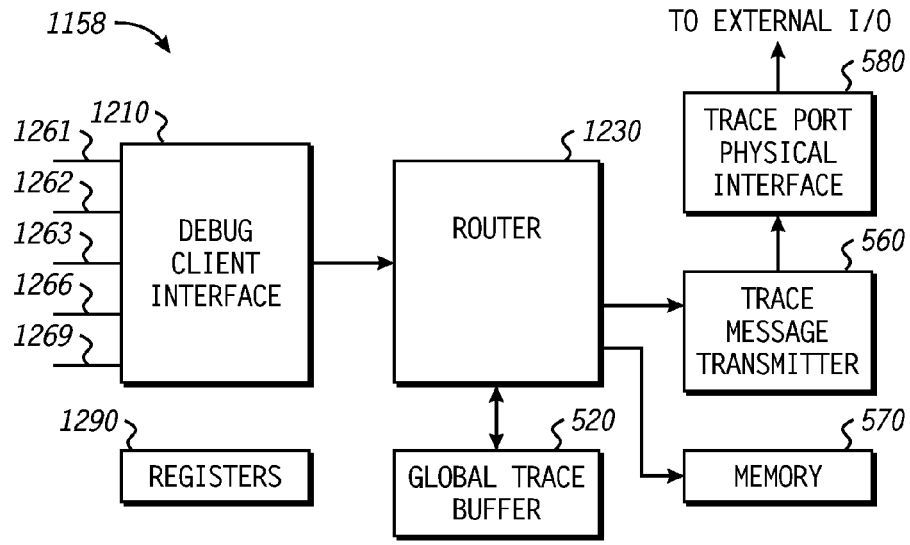
FIG. 12 is a block diagram illustrating a system debug module of FIG. 11 in greater detail in accordance with a particular embodiment of the present disclosure.

FIG. 12 illustrates a specific embodiment of system debug controller 1158 that does not include a tag compare module nor a tag RAM, but that does include a debug client interface 1210, a router 1230, a global trace buffer 520, trace message transmitter 560, trace port physical interface 580, and memory 570. In FIG. 12, features having the same reference numeral as features previously described, operate in a similar manner as that previously described features, and are not described further with referenced FIG. 12.

Debug client interface 1210 is connected to receive all kinds of trace information from various masters of data processing system 1100 via interconnects 1261-1263, 1266, and 1269. Received trace information is stored at the global trace buffer 520, via router 1230, for further handling. In particular, the data trace information stored at the global trace buffer 520 can be subsequently accessed by the router 1230, which determines whether the data trace information is to be routed to the trace message transmitter 560, or routed to memory 570. Thus, while the system debug module of FIG. 12 continues to interface with each of the client debug modules to receive and handle trace information, the system debug module of FIG. 12 does not include a global filter that can further discard data trace information based upon a data trace address.

The system debug module 1158 is connected to the system debug module 1150, which is implemented in a different integrated circuit die 1102. Unlike the system debug module 1158, the system debug module 1150 does include a global filter, such as that described in reference to FIG. 5. Thus, data trace information can be provided from the system debug module 1159 to the system debug module 1150 for global filtering by the system debug module 1150 as previously described, before being stored in memory or forwarded to an external debugger 1190. It will be appreciated, that the die 1102 can also include client debug modules that interface with the system debug module 1150. Such client debug modules can be associated with data processors as previously described. The integrated circuit die 1101 and 1102 can reside in a common package or separate packages.

Figure 13:
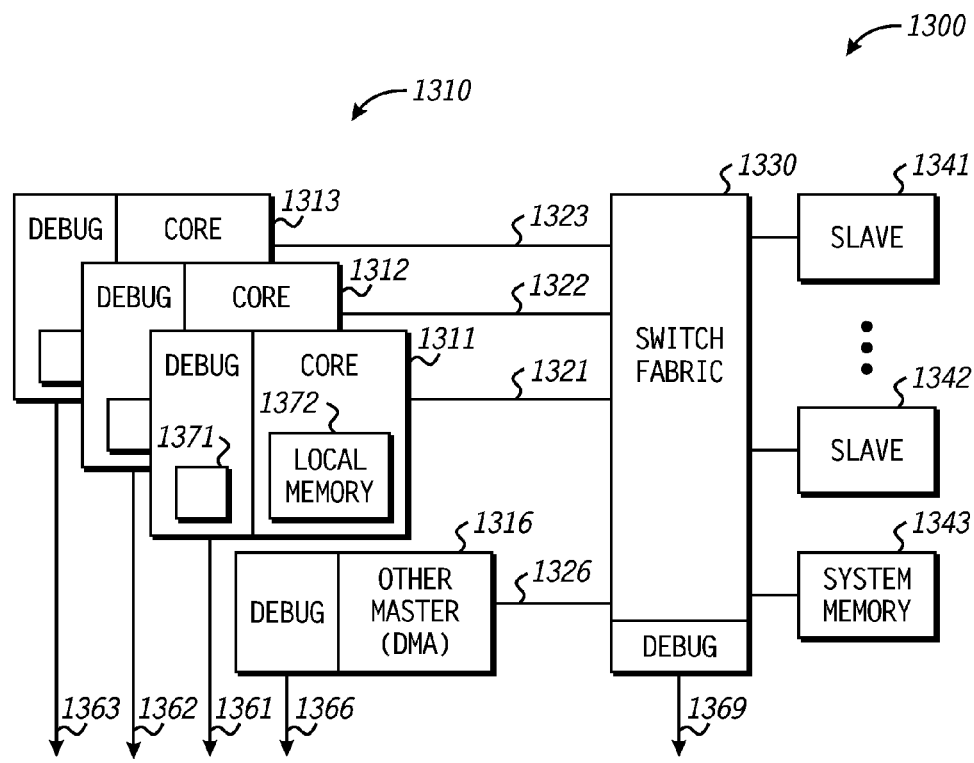
FIG. 13 is a block diagram of a processing system in accordance with a specific embodiment of the present disclosure.

FIG. 13 illustrates another embodiment of the present disclosure that includes a processing system 1300 that includes secondary data trace filters at each one of a plurality of local debug modules, instead of a common (secondary) data trace filter at a system debug controller as previously described. In the illustrated example, the processing system 1300 includes a switch fabric 1330 that is similar to the switch fabric 130 of FIG. 1 to communicate information amongst a plurality of master and slave devices. The master devices connected to the switch fabric 1330 include a direct memory access (DMA) module 1316, and general-purpose instruction based data processors 1311-1313. The slave devices connected to the switch fabric 130 include slave modules 1341-1343, where slave module 1343 is specifically illustrated to be a system memory device.

The general purpose instruction-based data processors 1311-1313 can each be of the same or different type. For purposes of discussion, it is presumed that each of the data processors 1311-1313 are of the same type as data processor 1311, which is illustrated in greater detail at FIG. 13 to include a core portion (CORE) and a debug portion (DEBUG). The core portion of data processors 1311-1313 are connected to the switch fabric 1330 via interconnects 1321-1323. The core portion of data processor 1311 is specifically illustrated to include a local memory 1372. The debug portion of data processor 1311 includes a primary debug filter and a secondary debug filter as illustrated in greater detail with respect to FIG. 14. Trace information from the debug portion of data processor 1311 can be provided to an IO port connected to interconnect 1361. The IO port can interface with an external debug port to communicate with an external debugger, or can interface with other portions of an integrated circuit die that includes data processor 1311. For example, the IO port connected to interconnect 1361 can be a JTAG port, a trace port, or other type port.

Figure 14:
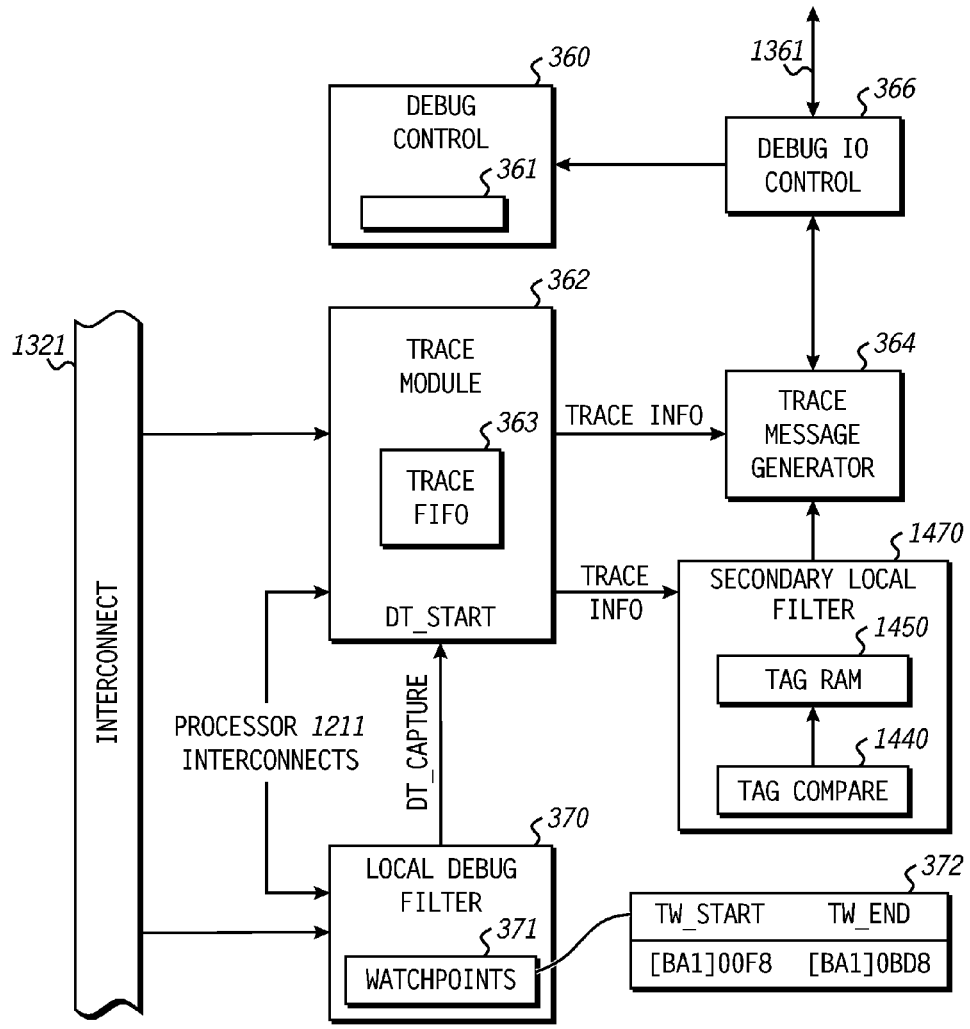
FIG. 14 is a block diagram illustrating a debug control module of FIG. 13 in greater detail in accordance with a particular embodiment of the present disclosure.

FIG. 14 illustrates a particular embodiment of a local debug module of data processor 1311. The local debug module of FIG. 14 includes features previously described with respect to FIG. 3, which are similarly numbered at FIG. 14. These similarly numbered features operate in a similar manner as that previously described and include debug I/O controller 366, debug controller 360, trace module 362, local debug filter 370, and trace message generator 364. The trace module 362 and the local debug filter 370 are connected to the interconnect 1321 of FIG. 13, which corresponds to the interconnect 121 of FIG. 3. In addition to the previously described features, FIG. 14 further includes a secondary local filter 1470 that is connected to the trace module 362 to receive information stored at the trace FIFO 363. Secondary local filter can further filter data trace information that has been previously captured, e.g., filtered by the (primary) local debug filter 370, e.g., data trace information stored at FIFO 363. Note, the local debug filter 370 is considered a primary debug filter because it monitors operation of its corresponding data processor for the occurrence of watchpoints, and enables trace module 362 capture specific trace information in response to the occurrence of the watchpoints. Whereas the secondary local filter 1470, only filters data trace information having already met a data trace criteria identified by the local debug filter 370.

The secondary filtering implemented by the secondary local filter 1470 can be enabled or disabled. When secondary filtering is not enabled, the trace information stored at the trace FIFO 363 will be provided to the trace message generator without being further filtered by the secondary filter of 1470, and will be communicated to interconnect 1361, via debug I/O controller 366, without further filtering.

The secondary local filter 1470 is illustrated to include a tag compare module 1440 and a tag RAM 1450, which correspond to the tag compare module 540 and the tag RAM 550 of FIG. 5, respectively. The tag compare module 1440 and the tag RAM 1450 can operate in a similar manner as that described with respect to the tag compare module 540 in tag RAM 550 of FIG. 5. In particular, the tag RAM 1450 can be programmable, as previously described, wherein secondary filtering criteria is stored for exclusive use of the local debug module of data processor 1311 to determine whether a particular data trace information being evaluated is to be maintained or discarded. Thus, the secondary local filter 1470 can apply a filtering criteria stored at the tag RAM 1450 to determine which data trace information meets the secondary filtering criteria, and is therefore forwarded to the trace message generator 364 for further handling, and to determine which data trace information does not meet the secondary filtering criteria, and is therefore discarded. It will be appreciated, that some or all of the other data processors of FIG. 13 can include their own corresponding secondary local filters. It will also be appreciated, that according to an embodiment, non-data trace information stored at trace FIFO 363 can be provided to trace message generator 364 without additional filtering, e.g., non-data trace information is forwarded to the trace message generator.

Figure 15:
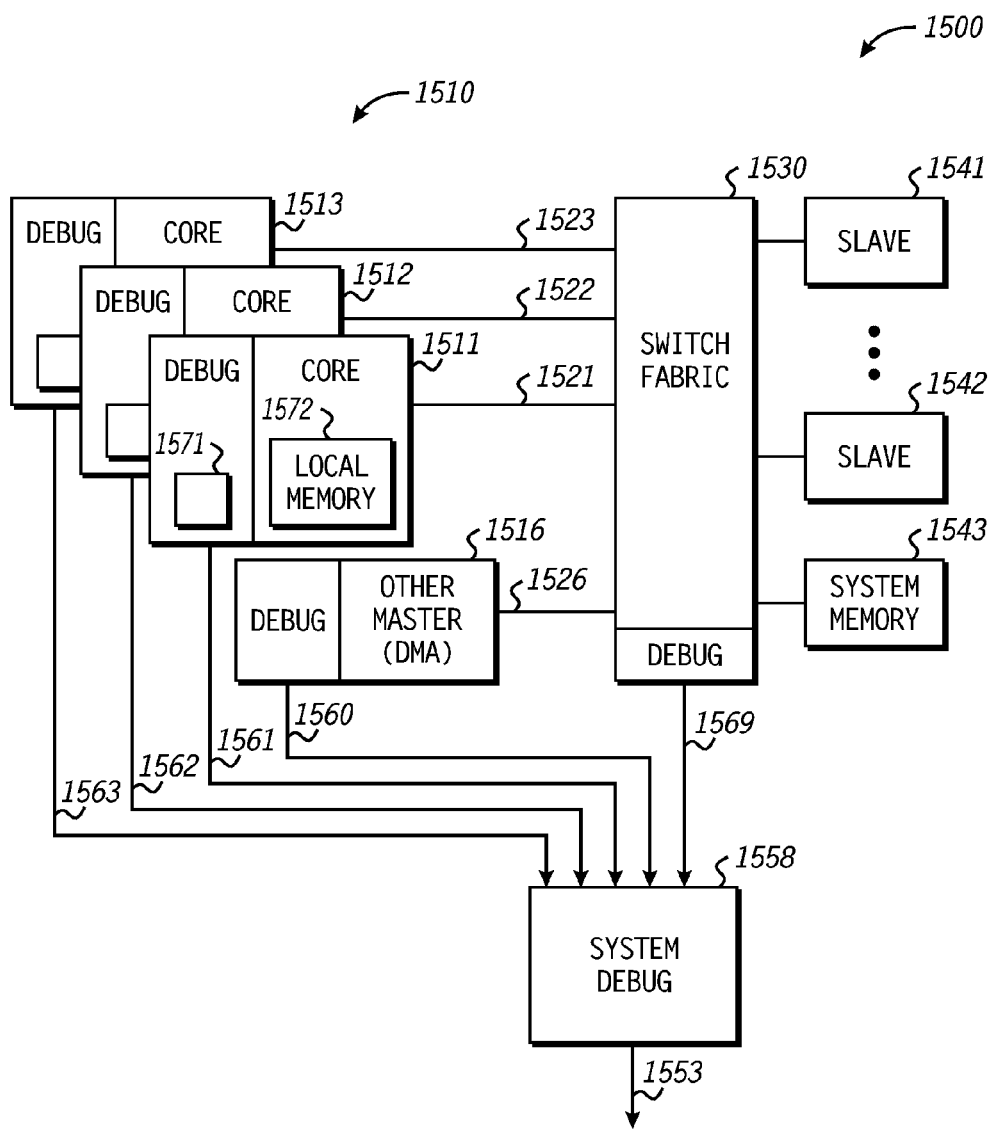
FIG. 15 is a block diagram of a processing system in accordance with a specific embodiment of the present disclosure.

FIG. 15 Illustrates in block diagram form, an alternate processing system 1500 that includes a system debug module 1558 that does not include a global data trace filter, but instead includes a plurality of local debug modules each of which individual can implement primary and secondary data trace filtering criteria as previously described with respect to the processing system 1300 of FIG. 13 The processing system 1500 includes: a switch fabric 1530 that corresponds to the switch fabric 1330; general-purpose instruction based data processors 1511-1513, that correspond to data processors 1511-1513; slave modules 1541-1543 that correspond to slave modules 1341-1343; and a system debug module 1558 that is similar to the system debug module 1158 of FIG. 11. The system debug module 1558 of FIG. 15 does not include a global filter module as previously described with respect to FIG. 1, but instead receives data trace information from various debug clients for further handling, such as for routing purposes as previously described. In that each of the debug clients of the processing system 1500 can have their own secondary filter, there is no need for a global filter at the system debug module 1558.

In a first aspect, a processing system can include a first interconnect of a first data processor to communicate information between a portion of the first data processor and a first memory. The system can also include a first debug module, of the first data processor, coupled to the first interconnect, the first debug module can include a first trace buffer to store data trace information of the first memory that meets a first data trace criteria of the first debug module, and a first data trace filter module coupled to the first trace buffer to filter out data trace information stored at the first trace buffer that does not meet a second data trace criteria.

In one embodiment of the first aspect, the system includes a programmable storage location where the second data trace criteria is stored. In another embodiment, each bit of a plurality of data bits of the programmable storage location corresponds to a plurality of bits of the first memory; and the second data trace criteria is not met in response to a bit of the programmable storage location that corresponds to an address of the data trace information being negated. In yet another embodiment, the first trace buffer is to maintain data trace information that meets the second data trace criteria, wherein the second data trace criteria is met in response to the bit of the programmable storage location that corresponds to the address of the data trace information being asserted.

In a further embodiment of the first aspect, the first interconnect and the first debug module are formed at an integrated circuit die, and the integrated circuit die includes an external debug port through which data trace information stored at the first buffer that is not filtered out is to be communicated to external the integrated circuit die. In an even further embodiment, the processing system includes a second interconnect of a second data processor to communicate information between portions of the first data processor including a first memory. The system further includes a second debug module, of the second data processor, coupled to the second interconnect, the second debug module includes a second trace buffer to store data trace information of the second memory that meets a third data trace criteria of the second debug module, and a second data trace filter module coupled to the second trace buffer to filter out data trace information stored at the second trace buffer that does not meet a fourth data trace criteria.

In another embodiment of the first aspect, the first and second interconnects and the first and second debug modules are formed at an integrated circuit die, and the integrated circuit die includes a first external debug port through which data trace information stored at the first buffer that is not filtered out is to be communicated to external the integrated circuit die, and the integrated circuit die further includes a second external debug port through which data trace information stored at the second buffer that is not filtered out is to be communicated to external the integrated circuit die. In still another embodiment, the first and second interconnects and the first and second debug modules are formed at an integrated circuit die, and the integrated circuit die includes a first external debug port through which data trace information stored at the first buffer that is not filtered out is to be communicated to external the integrated circuit die, and through which data trace information stored at the second buffer that is not filtered out is to be communicated to external the integrated circuit die.

In a particular embodiment of the first aspect, the first debug module is to capture the data trace information from the interconnect. In a more particular embodiment, the data trace information includes address information of the first memory, and data information associated with a location corresponding to the address location.

In a second aspect, a method can include storing a first plurality of data trace information at a first debug module in response to modifying data values stored at a first range of data address locations indicated by a first filter criteria, and filtering the first plurality of data trace information at the first debug module based upon a second filter criteria.

In one embodiment of the second aspect, wherein filtering includes transmitting data trace information of the first plurality of data trace information to a location not local to the first debug module in response to the second filter criteria being met, and otherwise discarding the data trace information in response to the second filter criteria not being met. In another embodiment, the second filter criteria is met in response to a bit of a programmable location of the first debug module being asserted that corresponds to a data address of the data trace information being filtered. In still another embodiment, wherein filtering includes accessing a programmable location of the first debug module based upon a portion of a data address of the data trace information to determine if a data trace information of the first plurality of data trace information meets the second filter criteria.

In a particular embodiment of the second aspect, the programmable location of the first debug module includes a plurality of bits, each bit of the plurality of bits corresponding to a word of a plurality of words, wherein the plurality of words are within the first range of data address locations. In a more particular embodiment, the location not local to the first debug module is at least one of an external debug port of an integrated circuit die that includes the first debug module, or a memory of the integrated circuit die. In an even more particular embodiment, the method includes generating a second plurality of data trace information at a second debug module in response to modifying data values stored at a second range of data address locations indicated by a third filter criteria, and filtering the second plurality of data trace information at the second debug module based upon a fourth filter criteria.

In a third aspect, a data processing system can include a first debug filter to store, at a first trace buffer, first data trace information indicative of stored data values within a first specified address range that have been modified by a first data processor, and a second debug filter to store, at a second trace buffer, second data trace information indicative of stored data values within a second specified address range that have been modified by a second data processor. The system can also include a third debug filter to filter out data trace information stored at the first trace buffer that does not meet a first data trace criteria, and a fourth debug filter to filter out data trace information stored at the second trace buffer that does not meet a second data trace criteria.

In one embodiment of the third aspect, the data processing system includes a system debug controller coupled to the first and second data processors to receive data trace information that is not filtered out by the third and fourth debug filters. In another embodiment, the data processing system includes a first programmable memory local to the first data processor that stores the first data trace criteria, and a second programmable memory local to the second data processor that stores the second data trace criteria.

As used herein, the term "corresponding" when used in reference to an individual item of a plurality of items and another item is intended to mean the existence of a one-to-one relationship. For example, the phrase "each data processor of the plurality of data processors is connected to a corresponding local memory" is intended to indicate that each data processor of the plurality of data processors is connected to a different local memory than any other one of the data processors. Similarly, the phrase "each data processor of a plurality of data processor is to perform a task based upon a corresponding register value", it is to be understood, that each data processor would be perform the task using a value from a different register location.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A processing system comprising:
   a first interconnect of a first data processor to communicate information between a portion of the first data processor and a first memory;
   a first debug module, of the first data processor, coupled to the first interconnect, the first debug module comprising:
      a first trace buffer to store data trace information of the first memory that meets a first data trace criteria of the first debug module;
      a first data trace filter module coupled to the first trace buffer to filter out data trace information stored at the first trace buffer that does not meet a second data trace criteria;
   a second interconnect of a second data processor to communicate information between portions of the second data processor a second memory; and
   a second debug module, of the second data processor, coupled to the second interconnect, the second debug module comprising:
      a second trace buffer to store data trace information of the second memory that meets a third data trace criteria of the second debug module; and
      a second data trace filter module coupled to the second trace buffer to filter out data trace information stored at the second trace buffer that does not meet a fourth data trace criteria.

2. The processing system of claim 1 further comprising a programmable storage location where the second data trace criteria is stored.

3. The processing system of claim 2 wherein each bit of a plurality of data bits of the programmable storage location corresponds to a plurality of bits of the first memory; and the second data trace criteria is not met in response to a bit of the programmable storage location that corresponds to an address of the data trace information being negated.

4. The processing system of claim 3, the first trace buffer is to maintain data trace information that meets the second data trace criteria, wherein the second data trace criteria is met in response to the bit of the programmable storage location that corresponds to the address of the data trace information being asserted.

5. The processing system of claim 1, wherein the first interconnect and the first debug module are formed at an integrated circuit die, and the integrated circuit die includes an external debug port through which data trace information stored at the first buffer that is not filtered out is to be communicated to external the integrated circuit die.

6. The processing system of claim 1, wherein the first and second interconnects and the first and second debug modules are formed at an integrated circuit die, and the integrated circuit die includes a first external debug port through which data trace information stored at the first buffer that is not filtered out is to be communicated to external the integrated circuit die, and the integrated circuit die further includes a second external debug port through which data trace information stored at the second buffer that is not filtered out is to be communicated to external the integrated circuit die.

7. The processing system of claim 1, wherein the first and second interconnects and the first and second debug modules are formed at an integrated circuit die, and the integrated circuit die includes a first external debug port through which data trace information stored at the first buffer that is not filtered out is to be communicated to external the integrated circuit die, and through which data trace information stored at the second buffer that is not filtered out is to be communicated to external the integrated circuit die.

8. The processing system of claim 1, wherein the first debug module is to capture the data trace information from the interconnect.

9. The processing system of claim 1, wherein the data trace information includes address information of the first memory, and data information associated with a location corresponding to the address location.

10. The system of claim 1, wherein the first trace buffer is to store the data trace information of the first memory in response to detecting at the interconnect a write access of the first memory.

11. A data processing system comprising:
a first debug filter to store, at a first trace buffer, first data trace information indicative of stored data values within a first specified address range that have been modified by a first data processor;
a second debug filter to store, at a second trace buffer, second data trace information indicative of stored data values within a second specified address range that have been modified by a second data processor;
a third debug filter to filter out data trace information stored at the first trace buffer that does not meet a first data trace criteria; and
a fourth debug filter to filter out data trace information stored at the second trace buffer that does not meet a second data trace criteria.

12. The data processing system of claim 11 further comprising:
a system debug controller coupled to the first and second data processors to receive data trace information that is not filtered out by the third and fourth debug filters.

13. The data processing system of claim 11 further comprising:
a first programmable memory local to the first data processor that stores the first data trace criteria; and
a second programmable memory local to the second data processor that stores the second data trace criteria.

14. A method comprising:
storing, at a first trace buffer, first data trace information that is indicative of stored data values within a first specified address range that has been determined by a first debug filter to have been modified by a first data processor;
storing at a second trace buffer, second data trace information that is indicative of stored data values within a second specified address range that has been determined by a second debug module to have been modified by a second data processor;
filtering out data trace information stored at the first trace buffer that has been determined by a third debug filter to not meet a first data trace criteria; and
filtering out data trace information stored at the second trace buffer that has been determined by a fourth debug filter to not meet a second data trace criteria.

15. The method of claim 14 further comprising:
providing to a system debug controller, from the first and second data processors, the data trace information that is not filtered out by the third and fourth debug filters.

16. The method claim 14, wherein storing the first data trace information includes storing the first data trace information at a first memory that is local to the first data processor; and storing the second data trace information includes storing the second data trace information at a second memory that is local to the second data processor.

* * * * *